3,068,269
PROCESS FOR PRODUCING TRIALKYL PHOSPHITES

John Streich, Westminster, and William E. Jones, Commerce Town, Colo., assignors to Shell Oil Company, New York, N.Y., a corporation of Delaware
No Drawing. Filed Jan. 31, 1961, Ser. No. 96,063
5 Claims. (Cl. 260—461)

This invention relates to an improved process for the production of trialkyl phosphites, particularly trimethyl phosphite.

It is well known that trialkyl phosphites can be prepared by the reaction of alkanols with phosphorous trichloride or tribromide, provided that the hydrogen halide (hydrogen chloride or bromide) formed during the reaction is removed substantially as soon as it is formed. If the hydrogen halide is not so removed, it immediately reacts with the trialkyl phosphite to form the dialkyl phosphite. In the past, removal of the hydrogen halide has been accomplished by means of a tertiary amine, which reacts with the hydrogen halide to form the amine hydrohalide salt, which does not react appreciably with the trialkyl phosphite. Invariably, the amine hydrohalides have been insoluble in the reaction mixture. Their volume has been large—three moles of the hydrohalide are formed for every mole of trialkyl phosphite formed—so that various means have had to be employed to avoid adverse effects upon the desired reaction caused by their presence. Thus, when the amine hydrohalide is solid, it has been necessary to incorporate in the reaction mixture a large amount of a solvent, so that the reaction mixture will be sufficiently fluid to permit the reaction to go forward. The use of the solvent has to some extent at least been avoided by using an amine such as 2-picoline which forms a hydrohalide which is liquid at the reaction temperature. These liquid amine hydrohalides, are, however, substantially immiscible with the trialkyl phosphite products. The large volume of the amine and hydrohalide has led to difficulties in maintaining the reactants in the intimate contact required to effect the desired reaction, and to effect the necessary prompt reaction of the amine with the hydrogen halide which is evolved. It has been found necessary to provide a substantial excess of the amine and of the alkanol to insure high yields of the trialkyl phosphite. Further, to maintain these amine hydrohalides as liquids, it is necessary to employ elevated temperatures—of the order of about 80° C. and above—which is undesirable because of reduction in yield of the trialkyl phosphite that ordinarily accompanies use of such temperatures. Also, whether the amine hydrohalide be solid, or liquid, difficulty has been encountered in effecting complete separation of the hydrohalide from the trialkyl phosphite product—in the case of the solid hydrohalide, it tends to adsorb the phosphite product and because of its large bulk thus reduces recovery of the product, while in the case of the liquid hydrohalide, it is difficult to effect separation of the last portions of product therefrom by decantation or like techniques, and in some cases difficulty is encountered in effecting complete separation of the two phases—product phase and hydrohalide phase—within a reasonably short period. The art does not show that distillative techniques are feasible for the separation.

We now have found that the use of triallylamine as the hydrogen halide acceptor substantially overcomes all of the foregoing objections, and permits preparation of trialkyl phosphites in exceptionally high conversions and yields in a simple, readily performed manner. The reactants—the alkanol and phosphorous trichloride—are both substantially soluble in triallylamine, so that the amine acts to provide a liquid reaction medium. The product—trialkyl phosphite—is readily soluble in both the amine and the amine hydrohalide, which is liquid at the conditions employed, so that a homogeneous reaction mixture is maintained throughout the reaction. There is no separate amine hydrohalide phase, so that mixing of the reactants is readily effected. It is not necessary—and is generally considered to be undesirable—to employ any significant excess of the amine, and generally it is desirable to employ no more than a slight excess of the alkanol. The product trialkyl phosphite is readily recovered from the crude reaction medium by distillation. Through the use of triallylamine as the hydrogen halide acceptor, a process suitable for the large-scale preparation of trialkyl phosphites is available.

It will be appreciated that before our discovery that triallylamine could be used as the hydrogen halide acceptor, we considered it very unlikely that this amine could be used for this purpose. Since triallylamine contains three of the reactive allyl—olefinically unsaturated—groups, we expected that it would be highly reactive with the phosphorous trihalide. It was indeed surprising that it was found to be substantially inert with respect to the phosphorous trihalide and acted only as a hydrogen halide acceptor.

Our discovery thus provides a practical process for the preparation of trialkyl phosphites, and this process, briefly speaking, comprises reacting an alkanol with a phosphorous trihalide in the presence of triallylamine and thereafter recovering the corresponding trialkyl phosphite by distillation from the crude reaction mixture. Since the general reaction of the alcohols with phosphorous trihalides in the presence of tertiary amines to form triester phosphites is well known, it also may be said that our invention comprises the improvement of employing triallylamine as the hydrogen halide acceptor and of recovery of the trialkyl phosphite product by direct distillation of the crude reaction mixture.

As is shown in the art, the reaction of alkanols with phosphorous trihalides wherein the halide is middle halogen is a general one, and the improved process of this invention likewise is general to that reaction. However, the process of this invention is particularly of interest for the preparation of the lower trialkyl phosphites—wherein for example each alkyl group contains from 1 to 4 carbon atoms—by reaction of the corresponding lower alkanols, since these lower phosphites are of great interest commercially. In particular, the process of this invention readily produces trimethyl phosphite of high purity in high yield from methanol and a phosphorous trihalide.

The suitable phosphorous trihalides are those wherein the halogen is middle halogen—that is, bromine or chlorine.

In accordance with this invention, an alkanol is reacted with either phosphorus trichloride or tribromide, in the presence of triallylamine in an amount sufficient to react with all of the hydrogen halide (chloride or bromide) evolved in the reaction of the alkanol with the phosphorous trihalide, then the product trialkyl phosphite is directly distilled from the resulting crude reaction mixture. Preferably, no extraneous material is used as solvent, although as will be pointed out in more detail hereinafter, a solvent may be used without deleterious effect, provided that it is inert and has physical characteristics, particularly boiling point, which do not interfere with separation of the trialkyl phosphite product.

At least the stoichiometric amount of alkanol is used, relative to the amount of phosphorous trihalide charged—i.e., at least three moles of alkanol are used per mole of phosphorus trihalide. Preferably a slight excess—from about one-half percent to about five percent, with about one percent being optimum in most cases—of the alkanol is used, relative to the amount of phosphorus trihalide used.

At least the stoichiometric amount of triallylamine is used: again, at least three moles of triallylamine per mole of phosphorous trihalide. With adequate mixing, no substantial excess of the amine is necessary. By this is meant that no more than about a 5% excess of amine over the stoichiometric amount is required. If more than about 10% to 15% excess of amine is used, a 2-phase, liquid-liquid system results, if no extraneous solvent is used. The formation of the two phases is generally undesirable, as is the use of an extraneous solvent. If the manner of conducting the reaction does not permit adequate intimate mixing of the reaction mixture, it may be necessary to employ an excess—up to as much as 60%—on a stoichiometric basis. Preferably, where adequate mixing can be effected, because no more is needed and any substantial excess can cause difficulty, it is desirable to employ substantially the stoichiometric amount of triallylamine.

The reaction of the alkanol with the phosphorous trihalide must be carried out at any suitable temperature—for example, the reaction can be conducted at temperatures as low as —30° C. and at temperatures as high as 200° C. However, depending upon the phosphorous trihalide used, it is preferred to employ certain more limited ranges of temperature—e.g., temperatures sufficiently high that the triallylamine hydrohalide is a readily fluid liquid, but not so high that significant dissociation of the hydrohalide occurs, since such dissociation produces free hydrogen halide, which in turn reduces the yield of trialkyl phosphite. When the phosphorous trihalide is phosphorous trichloride, it is possible to employ temperatures as low as —30° C.—triallylamine hydrochloride melts at a temperature of about —20 to —10° C. but readily supercools to —30° C.—but it is preferred to employ temperatures above 0° C. because the reaction mixture tends to become rather viscous below 0° C. When the phosphorous trihalide is phosphorous tribromide, the reaction temperature preferably is at least about 31° C., which is the melting point of triallylamine hydrobromide. While a suitable inert solvent could be used—in the case of the hydrochloride to provide a readily fluid reaction mixture below 0° C. and in the case of the hydrobromide to dissolve the solid hydrobromide at a temperature below about 31° C.—it is preferred to avoid the use of a solvent by using higher temperatures, since the presence of a solvent is otherwise ordinarily unnecessary, and its presence complicates the preparation of the trialkyl phosphite product by requiring additional process for recovering and handling the solvent. It is to be understood that in the case of the hydrobromide, the reaction can be carried out at a temperature below about 31° C., albeit at somewhat less convenience because of the presence of the solid hydrobromide.

Temperatures above about 100° C. are preferably avoided because triallylamine hydrohalides tend to dissociate to a significant extent at higher temperatures, permitting free hydrogen halide to be present in the reaction zone, with consequent reduction in the yield of the trialkyl phosphite product, unless precautions are taken to insure that the trialkyl phosphite is separated—for example, by vapor-liquid separation techniques—from the reaction mixture substantially immediately as the phosphite is formed. If such precautions can conveniently be taken, then the higher permissible temperatures—for example, from about 100° C. up to about 200° C.—can be employed. Thus, the reaction might be carried out at the boiling point of the trialkyl phosphite, the phosphite being distilled from the reaction mixture as it is formed, or a suitable solvent might be used to form a lower-boiling azeotrope with the trialkyl phosphite. (Reduced pressures could be used to reduce the reaction temperature.) Alternatively, the reaction could be carried out in the vapor phase at a temperature at which the triallylamine hydrohalide is liquid, the hydrohalide being condensed from the vapor phase as fast as it is formed. Where such techniques are not convenient, it is preferred to conduct the reaction in the liquid phase at a temperature below about 70° C. to avoid any significant degree of dissociation of the triallylamine hydrohalide. In most cases, optimum reaction rates, together with optimum conversions and yields will be obtained at reaction temperatures of from about 15° C. to about 65° C.

It is generally desirable to bring the reactants together gradually, as by adding one reactant slowly to the other, with adequate stirring, to maintain the reaction temperature within given limits. While either of the reactants can be added to the other, preferably the phosphorous trihalide is added to the alkanol, since this involves the largest volume of reaction mixture from the outset, thus providing moderation and better control of the reaction from the beginning. While all of the triallylamine may be present from the outset, the reaction appears to be best conducted by adding the phosphorous trihalide dissolved in part of the amine to the alkanol dissolved in the remainder of the amine. If the use of such solutions is not possible, or is inconvenient for any reason, it appears preferable that the phosphorous trihalide be dissolved in the amine, and this solution be added gradually to the alkanol, rather than adding a solution of the alkanol in the amine to the phosphorous trihalide. In any case, sufficient amine must be present at all times to react with the hydrogen halide as it is formed.

As a general matter, it will not be found necessary to employ any extraneous solvent, and since the use of such a solvent will require a step for its recovery and its use will unnecessarily complicate the process, it is generally best to avoid the use of a solvent. If a solvent is found to be necessary, however, it should be one which is inert and which has a boiling point that will permit ready separation of the trialkyl phosphite product. Suitable solvents include xylene, hexane, petroleum ether, kerosene, biphenyl, ethyl ether, methylene chloride, phenylcyclohexane, mono-nonylnaphthalene, mixtures of amylnaphthalenes, polyamylnaphthalenes, propylated biphenyl, mono- and polyamyl biphenyl, ethylated biphenyl and partially hydrogenated terphenyls. The amount of solvent should not be more than that required to provide the necessary homogeneity, and/or fluidity.

Where the reaction is conducted in the liquid phase, with no concurrent removal of the trialkyl phosphite product, the phosphite is recovered from the final reaction mixture by distillation. While the distillation ordinarily may be conducted at atmospheric pressure, preferably it is carried out under reduced pressure to reduce the required temperature. Reduction in the temperature is desirable to avoid decomposition of the trialkyl phosphite product, and to minimize the possibility of contamination of the product which might result from free hydrogen halide which might result from dissociation of the triallylamine hydrohalide. Distillation pressures in the range of from about 760 millimeters mercury down to about 0.1 millimeter mercury thus will be suitable, with pressures of from about 5 to about 50 millimeters mercury being most often the best.

The bottoms from the distillation—triallylamine hydrohalide and any small amount of dialkyl phosphite formed during the reaction, plus solvent, if any was used—is then treated with aqueous alkali to regenerate the amine and remove the water-soluble dialkyl phosphite. If no solvent is used, the amine is simply separated from the aqueous phase by decantation, centrifugation, distillation, including steam distillation, or like techniques, and then is suitable for the preparation of further trialkyl phosphite. If a solvent is used, then it may be separated from the amine or the amine-solvent mixture can be used directly in the preparation of further trialkyl phosphite.

Suitable alkalis include the oxides, hydroxides, carbonates and bicarbonates of the alkali metals (particularly sodium and potassium), and of the alkaline earth metals (particularly calcium), and mixtures of two or more of these.

As in other reactions involving phosphorous trihalides, with esters as products, it is desirable that no substantial amount of water be present in the reaction mixture, to avoid decomposition of product and/or to avoid possible undesirable side reactions; preferably the reaction mixture is maintained in a substantially anhydrous state.

The process of this invention is illustrated by the following example, which sets out the use of this process in a particular instance. In this example, parts by weight have the same relationship to parts by volume as has the kilogram to the liter.

*Example*

A mixture of 52 grams of triallylamine and 34 grams of phosphorous trichloride was slowly added, with stirring, over a period of ten minutes to a mixture of 52 grams of triallylamine and 24 grams of methanol, the temperature of the mixture being maintained at about 25° C. 3.0 moles of triallylamine and 3.03 moles of methanol were charged per mole of phosphorous trichloride. The reaction mixture was a homogeneous liquid. Trimethyl phosphite was separated from the reaction mixture by distillation of the mixture at 20 millimeters mercury pressure. The molar conversion of phosphorous trichloride to trimethyl phosphite was 92%.

Essentially the same procedure was carried out, employing reaction temperatures within the range of from 0° C. to 170° C., vapor phase reaction being used above 100° C. At temperatures below about 65° C., the molar conversion of phosphorous trichloride to trimethyl phosphite was of the order of 90% or more. At temperatures above 65° C., the molar conversion decreased, with conversions of about 60% being obtained at temperatures of 150–170° C.

These and other experiments established that with adequate agitation, no substantial excess of amine or alkanol is required to attain substantially quantitative conversion of phosphorous trichloride to trimethyl phosphite.

We claim as our invention:

1. In a process for the preparation of a trialkyl phosphite wherein an alkanol is reacted with a phosphorous trihalide, of the group consisting of phosphorous trichloride and phosphorous tribromide, in the presence of a tertiary amine as hydrogen halide acceptor, the improvement which consists of using triallylamine as the hydrogen halide acceptor, conducting the reaction at a temperature at which the triallylamine hydrohalide is liquid, and recovering trialkyl phosphite product in vapor phase from the resulting reaction mixture.

2. The improvement according to claim 1 wherein the alkanol contains from one to four carbon atoms.

3. In a process for the preparation of a trialkyl phosphite wherein an alkanol is reacted in liquid phase with a phosphorous trihalide, of the group consisting of phosphorous trichloride and phosphorous tribromide, in the presence of a tertiary amine as hydrogen halide acceptor, the improvement which consists of using triallylamine as the hydrogen halide acceptor, and recovering trialkyl phosphite product by distillation of the resulting reaction mixture.

4. In a process for the preparation of trimethyl phosphite wherein methanol is reacted with a phosphorous trihalide, of the group consisting of phosphorous trichloride and phosphorous tribromide, in the presence of a tertiary amine as hydrogen halide acceptor, the improvement which consists of using triallylamine as the hydrogen halide acceptor, conducting the reaction at a temperature at which the triallylamine hydrohalide is liquid, and recovering trimethyl phosphite product in vapor phase from the resulting reaction mixture.

5. In a process for the preparation of trimethyl phosphite wherein methanol is reacted in liquid phase with phosphorous trichloride in the presence of a tertiary amine as hydrogen chloride acceptor, the improvement which consists of using triallylamine as the hydrogen chloride acceptor, and recovering trimethyl phosphite product by distillation of the resulting reaction mixture.

References Cited in the file of this patent

UNITED STATES PATENTS 2,905,705     Kohler et al. _____ Sept. 22, 1959

FOREIGN PATENTS 573,117     Canada _____ Mar. 31, 1959